(12) United States Patent
Zhang et al.

(10) Patent No.: US 11,247,342 B2
(45) Date of Patent: Feb. 15, 2022

(54) SMART DEVICE CONTROL METHOD AND APPARATUS, AND STORAGE MEDIUM

(71) Applicant: Beijing Orion Star Technology Co., Ltd., Beijing (CN)

(72) Inventors: Shengmei Zhang, Beijing (CN); Jinxin Li, Beijing (CN); Ben Song, Beijing (CN)

(73) Assignee: Beijing Orion Star Technology Co., Ltd., Beijing (CN)

( * ) Notice: Subject to any disclaimer, the term of this patent is extended or adjusted under 35 U.S.C. 154(b) by 0 days.

(21) Appl. No.: 17/293,770

(22) PCT Filed: Oct. 9, 2019

(86) PCT No.: PCT/CN2019/110191
§ 371 (c)(1),
(2) Date: May 13, 2021

(87) PCT Pub. No.: WO2020/098421
PCT Pub. Date: May 22, 2020

(65) Prior Publication Data
US 2021/0354306 A1    Nov. 18, 2021

(30) Foreign Application Priority Data
Nov. 13, 2018 (CN) .......................... 201811346631.3

(51) Int. Cl.
*G05B 19/00* (2006.01)
*B25J 11/00* (2006.01)
(Continued)

(52) U.S. Cl.
CPC ......... *B25J 11/0005* (2013.01); *B25J 9/1697* (2013.01); *G06F 3/165* (2013.01);
(Continued)

(58) Field of Classification Search
CPC ..... B25J 11/0005; B25J 9/1697; G06F 3/165; G06F 3/167; G06K 9/00268;
(Continued)

(56) References Cited

U.S. PATENT DOCUMENTS

| 2014/0313303 | A1* | 10/2014 | Davis | ....................... A61B 5/68 348/77 |
| 2016/0171289 | A1  | 6/2016  | Lee et al. | |
| 2019/0200872 | A1* | 7/2019  | Matsuoka | ............ A61B 5/0013 |

FOREIGN PATENT DOCUMENTS

| CN | 104305648 A | 1/2015 |
| CN | 106956274 A | 7/2017 |

(Continued)

OTHER PUBLICATIONS

International Search Report for International Application No. PCT/CN2019/110191 dated Dec. 27, 2019.
(Continued)

*Primary Examiner* — Charlotte M Baker
(74) *Attorney, Agent, or Firm* — Meunier Carlin & Curfman LLC (57) ABSTRACT

A smart device control method and apparatus, and a storage medium, relating to the technical field of smart devices. Said method comprises: when a smart device is in a dormant state, acquiring an image of an environment surrounding the smart device; if a character feature is detected in the acquired image and the distance between a target having the character feature and the smart device is within a first specified distance, triggering the smart device to perform voice broadcasting; and after voice broadcasting, if it is detected that the distance between the target and the smart device is within a second specified distance, waking up the smart device, the second specified distance being less than the first specified distance

20 Claims, 3 Drawing Sheets

(51) Int. Cl.
  *G06T 7/55* (2017.01)
  *G06T 7/90* (2017.01)
  *B25J 9/16* (2006.01)
  *G06F 3/16* (2006.01)
  *G06K 9/00* (2006.01)

(52) U.S. Cl.
  CPC ......... *G06F 3/167* (2013.01); *G06K 9/00268* (2013.01); *G06K 9/00369* (2013.01); *G06T 7/55* (2017.01); *G06T 7/90* (2017.01)

(58) Field of Classification Search
  CPC .......... G06K 9/00369; G06K 9/00664; G06K 9/00228; G06K 9/00362; G06T 7/55; G06T 7/90; G06N 3/008
  USPC ............................................ 700/259; 348/77
  See application file for complete search history.

(56) References Cited

FOREIGN PATENT DOCUMENTS

| | | |
|---|---|---|
| CN | 107972048 A | 5/2018 |
| CN | 108153169 A | 6/2018 |
| CN | 108733417 A | 11/2018 |
| CN | 108733420 A | 11/2018 |
| CN | 109543578 A | 3/2019 |
| EP | 3285160 A1 | 2/2018 |
| TW | I576825 | 4/2017 |
| TW | I621071 | 4/2018 |
| WO | 2017100641 A1 | 6/2017 |

OTHER PUBLICATIONS

Decision to Grant for Chinese Application No. 201811346631.3 dated Oct. 15, 2020.
First Office Action for Chinese Application No. 201811346631.3 dated Apr. 15, 2020.

* cited by examiner

SMART DEVICE CONTROL METHOD AND APPARATUS, AND STORAGE MEDIUM

CROSS-REFERENCE TO RELATED APPLICATIONS

The present disclosure is a National Stage of International Application No. PCT/CN2019/110191, filed on Oct. 9, 2019, which claims priority to the Chinese Patent Application No. 201811346631.3, filed to China National Intellectual Property Administration on Nov. 13, 2018, the entire contents of which are incorporated herein by their references.

FIELD

The present disclosure relates to the technical field of smart devices, in particular to a method for controlling a smart device and apparatus, and a storage medium.

BACKGROUND

With continuous development of an artificial intelligence technology, more and more smart devices (e.g., a robot) come into the field of people's lives and work.

At present, various robots can provide different functions, e.g., a nursery robot can obtain and play fairy tales, children's songs, poems, etc. from a server to children, and a reception robot can help users to accomplish some businesses (e.g., bank card activating business) by themselves.

However, people still do not know what to do with unfamiliar smart devices which provide relatively complete functions though.

SUMMARY

Embodiments of the present disclosure provide a method and an apparatus for controlling a smart device, and a storage medium in order to solve the problems of low exposure rate and utilization ratio of a smart device in the prior art.

In a first aspect, an embodiment of the present disclosure provides a method for controlling a smart device, including:
  collecting an image of a surrounding environment of the smart device when the smart device is in a dormant state;
  triggering the smart device to broadcast voice if a character feature is detected in the collected image and a distance between a target with the character feature and the smart device is less than or equal to a first specified distance; and
  awakening the smart device if the distance between the target and the smart device is detected less than or equal to a second specified distance after the voice is broadcasted, wherein the second specified distance is less than the first specified distance.

In one possible implementation, the character feature includes at least one of the following features: a human face feature and a human body feature.

In one possible implementation, the collecting the image of the surrounding environment of the smart device includes:
  collecting a color map and a depth map of an object in front of the smart device in real time;
  wherein the triggering the smart device to broadcast voice if the character feature is detected in the collected image and the distance between the target with the character feature and the smart device is less than or equal to the first specified distance includes:
  performing character feature detection in real time according to the color map; and
  for each detected character feature:
  determining corresponding data of the target with the character feature in the depth map;
  determining the distance between the target with the character feature and the smart device according to the corresponding data of the target with the character feature in the depth map; and
  triggering the smart device to broadcast voice if the distance is less than or equal to the first specified distance.

In one possible implementation, the method further includes:
  determining that the voice will not be broadcasted repeatedly after voice broadcast is finished, if a distance between at least one of other targets with the character feature and the smart device is detected less than or equal to the first specified distance during voice broadcast.

In one possible implementation, the method further includes:
  after voice broadcast is finished for a set duration, broadcasting the voice repeatedly if a distance between at least one of other targets with the character feature and the smart device is detected less than or equal to the first specified distance.

In one possible implementation, the triggering the smart device to broadcast voice includes:
  triggering the smart device to broadcast voice in a volume larger than a preset volume, wherein the preset volume is a volume during interaction with the target after the smart device is awakened.

In one possible implementation, the triggering the smart device to broadcast voice includes:
  triggering the smart device to broadcast voice by randomly selecting a broadcast content from a preset broadcast content set; or
  triggering the smart device to broadcast voice by sequentially selecting broadcast contents from a preset broadcast content set; or
  triggering the smart device to broadcast voice circularly on broadcast contents in a preset broadcast content set.

In one possible implementation, the method further includes:
  receiving an instruction for adding a broadcast content, and adding a broadcast content included in the instruction into the preset broadcast content set; or
  receiving an instruction for altering a broadcast content and altering a corresponding broadcast content in the preset broadcast content set according to the instruction; or
  receiving an instruction for replacing a broadcast content and replacing a corresponding broadcast content in the preset broadcast content set according to the instruction.

In one possible implementation, the method further includes: displaying preset emoji on a screen of the smart device during voice broadcast.

In a second aspect, the present disclosure further provides an apparatus for controlling a smart device, including:
  an image collection module, configured to collect an image of a surrounding environment of the smart device when the smart device is in a dormant state;

a pre-awakening module, configured to trigger the smart device to broadcast voice if a character feature is detected in the collected image and a distance between a target with the character feature and the smart device is less than or equal to a first specified distance; and an awakening module, configured to awaken the smart device if the distance between the target and the smart device is detected less than or equal to a second specified distance after the voice is broadcasted, wherein the second specified distance is less than the first specified distance.

In one possible implementation, the character feature includes at least one of the following features: a human face feature and a human body feature.

In one possible implementation, the image collection module is further configured to collect a color map and a depth map of an object in front of the smart device in real time;

wherein the pre-awakening module is further configured to:

perform character feature detection in real time according to the color map; and for each detected character feature:

determine corresponding data of the target with the character feature in the depth map;

determine the distance between the target with the character feature and the smart device according to the corresponding data of the target with the character feature in the depth map; and trigger the smart device to broadcast voice if the distance is less than or equal to the first specified distance.

In one possible implementation, the pre-awakening module is further configured to: determine that the voice will not be broadcasted repeatedly after voice broadcast is finished, broadcast the voice repeatedly if a distance between at least one of other targets with the character feature and the smart device is detected less than or equal to the first specified distance during voice broadcast.

In one possible implementation, the pre-awakening module is further configured to: after voice broadcast is finished for a set duration, broadcast the voice repeatedly if the distance between the at least one of other targets with the character feature and the smart device is detected less than or equal to the first specified distance.

In one possible implementation, the awakening module is further configured to: trigger the smart device to broadcast voice in a volume larger than a preset volume, wherein the preset volume is a volume during interaction with the target after the smart device is awakened.

In one possible implementation, the awakening module is further configured to:

trigger the smart device to broadcast voice by randomly selecting a broadcast content from a preset broadcast content set; or trigger the smart device to broadcast voice by sequentially selecting broadcast contents from a preset broadcast content set; or trigger the smart device to broadcast voice circularly on broadcast contents in a preset broadcast content set.

In one possible implementation, the apparatus further includes a broadcast content maintenance module, configured to:

receive an instruction for adding a broadcast content and add a broadcast content included in the instruction into the preset broadcast content set; or receive an instruction for altering a broadcast content and alter a corresponding broadcast content in the preset broadcast content set according to the instruction; or receive an instruction for replacing a broadcast content and replace a corresponding broadcast content in the preset broadcast content set according to the instruction.

In one possible implementation, the apparatus further includes a broadcast emoji control module, configured to display preset emoji on a screen of the smart device during voice broadcast.

In a third aspect, the present disclosure further provides a calculating apparatus, including at least one processor; and a memory in communication connection with the at least one processor; wherein the memory stores an instruction executable by the at least one processor, and the instruction is executed by the at least one processor to cause the at least one processor to execute any method for controlling the smart device provided by the embodiment of the present disclosure.

In a fourth aspect, the present disclosure further provides a computer readable storage medium, wherein the storage medium stores a computer executable instruction, and the computer executable instruction is configured to make a computer execute any method for controlling the smart device in the embodiment of the present disclosure.

In a fifth aspect, the present disclosure further provides a computer program product, including a computer program stored on the computer readable storage medium, wherein the computer program includes a program instruction, and the program instruction implements steps of any method for controlling the smart device described above when executed by a processor.

By means of the method for controlling the smart device and apparatus and the storage medium provided by the present disclosure, whether a user in a long distance around has an interaction intention may be determined according to image detection, and the user with a potential interaction intention is guided to the smart device for operation in a manner of actively performing voice broadcast, so that the exposure rate and the utilization ratio of the smart device are improved.

Other characteristics and advantages of the present disclosure will be described in the following description, become obvious partially in the description or are understood by implementing the present disclosure. Objectives and other advantages of the present disclosure may be achieved by specified structures in the description, claims and accompanying drawings.

BRIEF DESCRIPTION OF THE DRAWINGS

Accompanying drawings described herein are used for providing further understanding for the present disclosure and constitute part of the present disclosure, and exemplary embodiments and description thereof of the present disclosure serve to illustrate the present disclosure and do not inappropriately limit the present disclosure.

DETAILED DESCRIPTION OF THE EMBODIMENTS

In order to improve the exposure rate and the utilization ratio of a smart device, and enable people to interact with the smart device more naturally and conveniently use businesses provided by the smart device, embodiments of the present disclosure provide a method for controlling a smart device and apparatus, and a storage medium. In order to better understand technical solutions provided by the embodiments of the present disclosure, some nouns and basic principles used in the solutions are simply described herein.

Description of the Nouns

Beyond a dormant state, the smart device may include two modes, e.g., a pre-awakening mode and an awakening mode.

The pre-awakening mode is a function design when a user is far away from the smart device. In the pre-awakening mode, the smart device collects an image of a surrounding environment in real time, determines existence of a user around, when a human face feature or a human body feature is detected, to start a voice broadcast function, e.g., voice greeting, and broadcast its available businesses, etc. so that the user can conveniently know functions of the smart device and is appealed for approaching the smart device and using the specific functions of the smart device.

The awakening mode is a function design when the user is close to the smart device. In the awakening mode, the smart device may interact with the user, accomplish corresponding services according to instructions of the user or actively guide the user to accomplish corresponding services, etc.

A depth map in a 3D (Dimensions) computer graph is an image including information of a distance to a surface of a scene object within a point of sight.

A character feature is used for describing features of a person, e.g., the human face feature and the human body feature.

Description of the Principles in order to improve the using efficiency of the smart device, in the embodiments of the present disclosure, the smart device adopts a natural interaction solution and guides the user to use the smart device to accomplish corresponding businesses. Specifically, when the user approaches the smart device, just like approaching a person, the both sides greet each other to start a conversation. In the embodiments of the present disclosure, when it is determined that there is a person in front of the smart device, the smart device may actively greet the person to broadcast its own functions. For example, a bank reception robot may broadcast 'Hi, I'm a bank assistant. What can I do for you' in a natural interaction mode. Thus, the smart device may greet the user in a natural interaction mode, appeal the user for interacting with the smart device and guide the user to accomplish operation thereon.

Further, in the embodiments of the present disclosure, in order to disturb the user as little as possible, when it is determined that the user is close to the smart device, the smart device actively greets the user to broadcast voice. When the user is far away from the smart device, the smart device does not greet the user. Thus, the user may be guided in a more natural mode to use the smart device.

In order to further understand the technical solutions provided by the embodiments of the present disclosure, description is made below in combination with the accompanying drawings.

Figure 1:
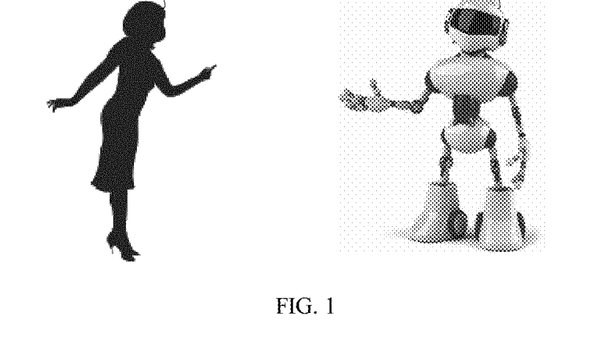
FIG. 1 is a schematic diagram of an application scene of a method for controlling a smart device in an embodiment of the present disclosure.

As shown in FIG. 1, a schematic diagram of an application scene of a method for controlling a smart device is provided in an embodiment of the present disclosure, the application scene includes a user 10 and a smart device 11. The smart device 11 may collect an image in front in real time, then analyzes whether a user exists in front according to the image, and enters a pre-awakening state, if the user exists in front and is close to the smart device, to broadcast voice so as to guide the user to use the smart device.

It should be noted that the smart device in the embodiment of the present disclosure may be a movable robot or a robot fixed to a position, and functions provided by the smart device may be various functions in all walks of life, e.g., a smart device for accompanying children to grow, a bank reception robot, etc. described above.

Figure 2:
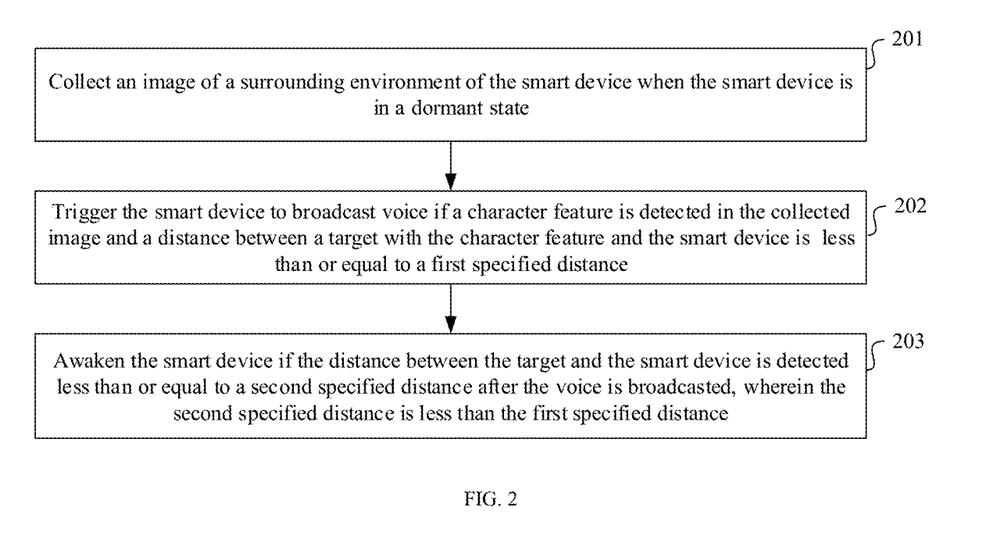
FIG. 2 is a first flow diagram of a method for controlling a smart device in an embodiment of the present disclosure.

The method for controlling the smart device provided by the embodiment of the present disclosure is further described below, as shown in FIG. 2, including the following steps.

Step 201: an image of a surrounding environment of the smart device is collected when the smart device is in a dormant state.

Step 202: the smart device is triggered to broadcast voice if a character feature is detected in the collected image and a distance between a target with the character feature and the smart device is less than or equal to a first specified distance.

During specific implementation, as for character feature detection, human face detection and/or human body detection may be performed, which is applicable to the embodiment of the present disclosure as long as it can be determined that a character image is included in the image.

The broadcasted voice may be set by a service provider of built-in functions of the smart device as required. For example, a bank may set its reception smart device to broadcast "Hi, I'm a bank assistant for . . . businesses of an individual user".

Step 203: the smart device is awakened if the distance between the target and the smart device is detected less than or equal to a second specified distance after the voice is broadcasted, wherein the second specified distance is less than the first specified distance.

For example, the first specified distance is 3 m, the second specified distance is 1.5 m, that is, if the distance between the user and the smart device is greater than 1.5 m and less than or equal to 3 m, voice is broadcasted, and then if it is determined that the user approaches the smart device and the distance is less than or equal to 1.5 m, the smart device may enter an awakening mode to interact with the user.

Accordingly, in the embodiment of the present disclosure, if the distance between the target and the smart device is less than or equal to the first specified distance, it is determined that the user may have an interaction intention in a short distance, then greeting the target through voice broadcast, and thus the target is guided to approach the smart device. Then when it is determined that the smart device is quite close to the target (that is, less than or equal to the second specified distance), it is determined that the target has the interaction intention, and the smart device starts to enter the awakening mode for interaction. Thus, the user is guided to the smart device for operation in a simple natural mode, and the utilization ratio of the smart device is improved.

Further, the distance between the smart device and the target may be determined through the following solutions.

Solution 1, the distance between the target in the surrounding environment and the smart device is detected through a distance sensor.

Accordingly, the solution that whether to broadcast voice may be understood in this way that when the character feature is detected and the distance between the target in the surrounding environment and the smart device is detected less than or equal to the first specified distance, the smart device may be triggered to broadcast voice. Otherwise, though the character feature is detected but the distance sensor detects that no object is within a range of less than or equal to the first specified distance, the smart device is not triggered to broadcast voice. That is, if the target is too far, it is determined that no user with the interaction intention exists, and voice broadcast is not needed for guiding.

Correspondingly, if no character feature is detected, no matter whether the distance sensor detects the object (the object may be a table, a shelter, etc.) within a range of less than or equal to the first specified distance, it is believed that no user with the interaction intention exists, and voice broadcast is also not triggered.

Solution 2: the image may be collected through an RGB-D camera, and then determination is made.

That is, a color map and a depth map of the object in front of the smart device are collected in real time; then character feature detection is performed in real time according to the color map; and after the character feature is detected, for each detected character feature, the following is performed: determining corresponding data of the target with the character feature in the depth map, determining the distance between the target with the character feature and the smart device according to the corresponding data of the target with the character feature in the depth map, and triggering the smart device to broadcast voice if the distance is less than or equal to the first specified distance.

During specific implementation, the depth map may be obtained through an infrared sensor and an infrared camera, that is, the infrared sensor emits infrared light, the infrared light is reflected to the infrared camera after encountering an obstruction, the infrared camera performs imaging according to captured infrared light, and depth data of each pixel in an infrared image are obtained. An RGB (red, green and blue)-D (Depth) camera color map is registered with a depth map, and thus pixel points of the two maps are in a one-to-one correspondence relation. Therefore, according to each pixel point of the detected character feature, the distance between the target with the character feature and the smart device may be determined. As there are a plurality of pixel points of the character feature, during specific implementation, the distance between the pixel point closest to the smart device and the smart device or the distance between the pixel point farthest from the smart device and the smart device may be adopted, or certainly an average value of distances of all the pixel points of the character feature may be adopted, which is not limited here.

Figure 3:
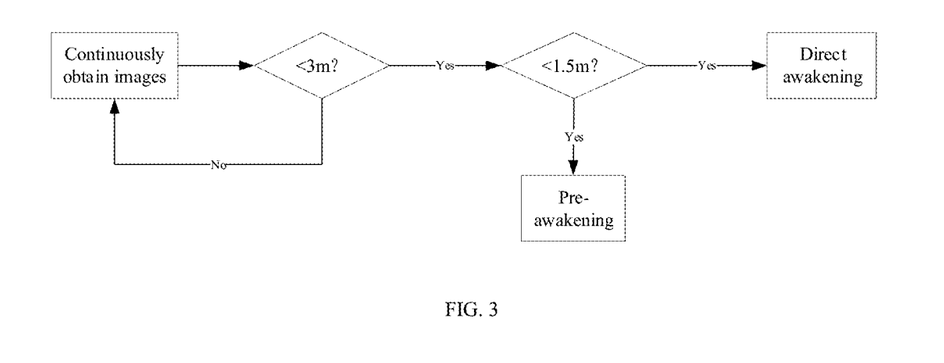
FIG. 3 is a schematic diagram of a method for controlling a smart device in an embodiment of the present disclosure.

In the embodiment of the present disclosure, when the target is close enough, it can be directly determined that the target has the interaction intention, and then the smart device enters the awakening mode. As shown in FIG. 3, the first specified distance is 3 m, relative to a first specified range which is 1.5 m to 3 m, and the second specified distance is 1.5 m, relative to a second specified range which is 0 to 1.5 m. After images are continuously obtained, the distance between the target with the character feature and the smart device is analyzed, when the distance is within 1.5 m to 3 m, pre-awakening is performed, and when the distance is within 0 m to 1.5 m, awakening is directly performed. Certainly, during specific implementation, the first specified distance and the second specified distance may be determined according to an experiment or actual demands, which is not limited here.

As for voice broadcast, during specific implementation, a manager of the smart device may input a broadcast file (in a form of a text file or an audio file) through a voice broadcast page by himself and the broadcast file is stored. Then when voice broadcast is needed, the smart device performs voice broadcast according to a pre-stored file. If the file is the text file, a Text To Speech (TTS) synthetic technology may be adopted for broadcast.

Certainly, during specific implementation, a plurality of broadcast contents may be set to form a preset broadcast content set. When voice broadcast is needed, the smart device is triggered to randomly select a broadcast content from the preset broadcast content set so as to broadcast voice, or the smart device is triggered to sequentially select broadcast contents from the preset broadcast content set so as to broadcast voice, or the smart device is triggered to broadcast voice circularly on the broadcast contents in the preset broadcast content set.

Certainly, during random selection, one or more broadcast contents may be randomly selected for broadcast. During specific implementation, there is an upper limit on the number of words of each of the voice content, and there may be an upper limit on the number of the voice contents as well (e.g., 10).

Correspondingly, the manager may update the broadcast contents set by himself, specifically, an instruction for adding a broadcast content is received, and a broadcast content included in the instruction is added into the preset broadcast content set; or an instruction for altering a broadcast content is received, and a corresponding broadcast content in the preset broadcast content set is altered according to the instruction; or an instruction for replacing a broadcast content is received, and a corresponding broadcast content in the preset broadcast content set is replaced according to the instruction.

Therefore, the manager may maintain the broadcast contents through the operations of adding, deleting and altering.

As for voice broadcast, besides the above-mentioned description, broadcast for the voice contents in the following scenes will be supplemented for supplementary description, including the following.

1), During voice broadcast, if the distance between at least one of other targets with the character feature and the smart device is detected less than or equal to the first specified distance, repeated voice broadcast is stopped after voice broadcast is finished.

That is, voice broadcast will not be repeated continuously when it is continuously detected that the distance between the target with the character feature and the intelligent is less than or equal to the first specified distance. Thus, the user may not be bothered continuously and auditory fatigue of the user is avoided. Meanwhile, resources consumed by voice broadcast may be reduced.

2), In the embodiment of the present disclosure, after voice broadcast is finished for a set duration, if the distance between the at least one of other targets with the character feature and the smart device is detected less than or equal to the first specified distance, voice broadcast is repeated.

For example, voice broadcast this time is finished for 5 s, i.e., after these 5 s passes, if a voice broadcast condition is met, voice broadcast is repeated. Thus, periodic detection is adopted and whether to broadcast voice is determined, consumption of electric energy and processing resources due to continuous voice broadcast are avoided, and balance is achieved between resource utilization and in-time user guiding.

3), When voice broadcast is needed, the smart device may be triggered to broadcast voice in a volume larger than a preset volume, wherein the preset volume is a volume during interaction with the target after the smart device is awakened. Thus, the voice content broadcasted by the smart device may draw the attention of the user, so that the user with the potential interaction intention may be more effectively guided to the smart device for operation.

4), In order to enable the user to understand and listen to the broadcasted contents in a more natural manner, during voice broadcast in the present disclosure, preset emoji may be displayed on a screen of the smart device. For example, a smiling face is shown so that the user may be interested in the smart device visually as well as acoustically and then be guided to the smart device.

In the embodiment of the present disclosure, during specific implementation, character feature detection and voice broadcast may serve as two independent programs, that is, image collection and character feature detection may be performed in real time, when the character feature is detected, the distance between the target with the character feature and the smart device is determined, if the distance is less than or equal to the first specified distance, a message is sent to a voice broadcast program, and the voice broadcast program determines whether to broadcast voice according to the received message.

Broadcasting voice after the set duration in 2) passes is taken for describing cooperative use of the two programs. Specifically, it is assumed that a specified duration is 5 s, at first, the voice broadcast program receives a message sent by a character feature detection program, then starts to broadcast "Hi, I'm the reception smart device XXX. What can I do for you?", before the voice content is finished, when another message sent by the character feature detection program is received, the message is omitted. Timekeeping is performed after broadcast for the voice content is finished, if the message sent by the character feature detection program is received within 5 s, the message is abandoned. If the message is received after 5 s passes, voice is broadcasted.

During specific implementation, whether a person enters or leaves a field of view of the smart device may be determined according to the collected image. If all persons within the field of view leave the field of view of the smart device during voice broadcast, broadcast may be terminated, and thus a purpose of saving the resources is achieved.

Figure 4:
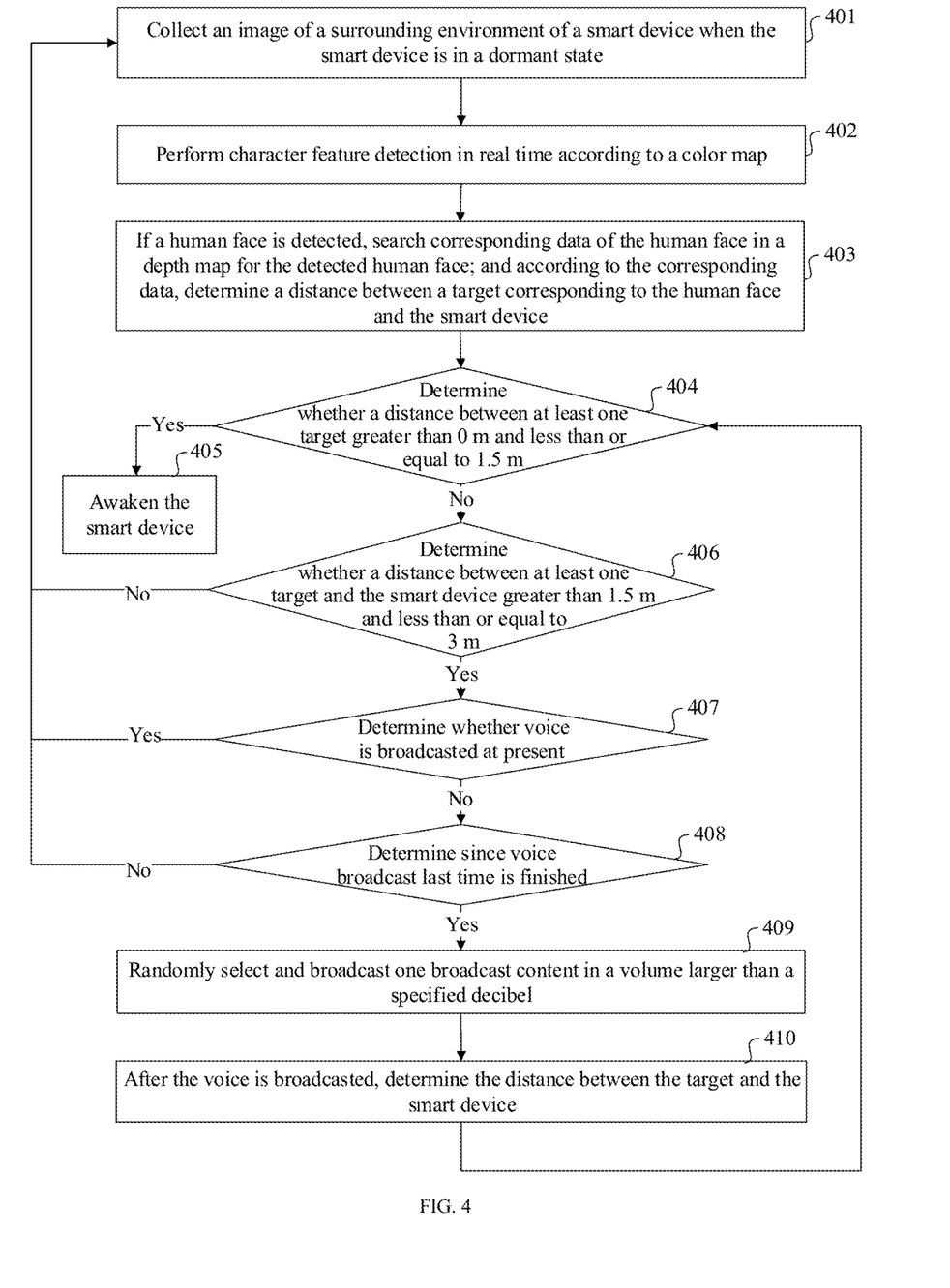
FIG. 4 is a second flow diagram of a method for controlling a smart device in an embodiment of the present disclosure.

In order to systematically understand the method for controlling the smart device provided by the embodiment of the present disclosure, description is made in combination with FIG. 4, including the following steps.

Step 401: the image of the surrounding environment of the smart device is collected when the smart device is in the dormant state.

Step 402: character feature detection is performed in real time according to the color map.

Step 403: if a human face is detected, corresponding data of the human face are searched in the depth map for the detected human face; and according to the corresponding data, the distance between the target corresponding to the human face and the smart device is determined.

Step 404: whether a distance between at least one target and the smart device is determined greater than 0 m to and less than or equal to 1.5 m, if yes, step 405 is performed, and otherwise, step 406 is performed.

Step 405: the smart device is awakened.

Step 406: whether a distance between at least one target and the smart device is determined greater than 1.5 m and less than or equal to 3 m, if yes, step 407 is performed, and otherwise, step 401 is performed.

Step 407: whether voice is broadcasted at present is determined, if yes, operation returns to perform step 401, and otherwise, step 408 is performed.

Step 408: whether a duration since voice broadcast last time is finished reaches the preset duration is determined, if not, operation returns to perform step 401, and if yes, step 409 is performed.

Step 409: one broadcast content is randomly selected and is broadcasted in a volume larger than a specified decibel.

Step 410: after voice broadcast is finished, the distance between the target and the smart device is determined, and then step 404 is performed.

Figure 5:
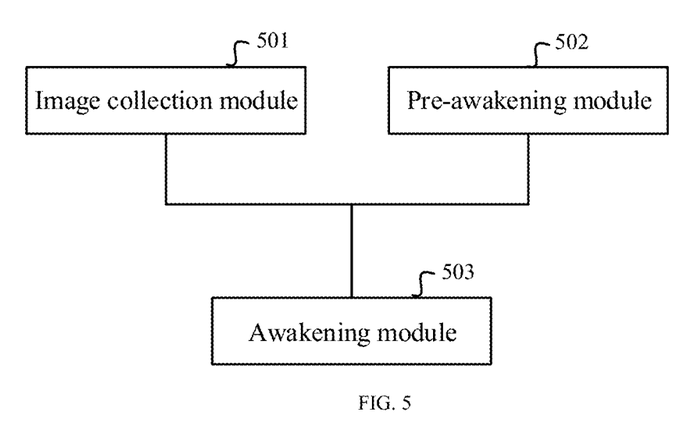
FIG. 5 is a schematic diagram of an apparatus for controlling the smart device in an embodiment of the present disclosure.

According to the same conception, an embodiment of the present disclosure further provides an apparatus for controlling a smart device, as shown in FIG. 5, including:

an image collection module 501, configured to collect an image of a surrounding environment of a smart device when the smart device is in a dormant state;

an pre-awakening module 502, configured to trigger the smart device to broadcast voice if a character feature is detected in the collected image and a distance between a target with the character feature and the smart device is less than or equal to a first specified distance; and an awakening module 503, configured to awaken the smart device if the distance between the target and the smart device is detected less than or equal to a second specified distance after voice broadcast, wherein the second specified distance is less than the first specified distance.

In one possible implementation, the character feature includes at least one of the following features: a human face feature and a human body feature.

In one possible implementation, the image collection module is further configured to collect a color map and a depth map of an object in front of the smart device in real time;

the pre-awakening module is further configured to:
perform character feature detection in real time according to the color map; and
for each detected character feature,
determine corresponding data of the target with the character feature in the depth map;
determine the distance between the target with the character feature and the smart device according to the corresponding data of the target with the character feature in the depth map; and
trigger the smart device to broadcast voice if the distance is less than or equal to the first specified distance.

In one possible implementation, the pre-awakening module is further configured to: determine that the voice will not be broadcasted repeatedly after voice broadcast is finished, if a distance between at least one of other targets with the character feature and the smart device is detected less than or equal to the first specified distance during voice broadcast.

In one possible implementation, the pre-awakening module is further configured to: after voice broadcast is finished for a set duration, broadcast the voice repeatedly if the distance between the at least one of other targets with the character feature and the smart device is detected less than or equal to the first specified distance, repeat voice broadcast.

In one possible implementation, the awakening module is further configured to: trigger the smart device to broadcast voice in a volume larger than a preset volume, wherein the preset volume is a volume during interaction with the target after the smart device is awakened.

In one possible implementation, the awakening module is further configured to:
trigger the smart device to broadcast voice by randomly selecting a broadcast content from a preset broadcast content set; or
trigger the smart device to broadcast voice by sequentially selecting broadcast contents from a preset broadcast content set; or
trigger the smart device to broadcast voice circularly on broadcast contents in a preset broadcast content set.

In one possible implementation, the apparatus further includes a broadcast content maintenance module configured to:
receive an instruction for adding a broadcast content and add a broadcast content included in the instruction into the preset broadcast content set; or
receive an instruction for altering a broadcast content and alter a corresponding broadcast content in the preset broadcast content set according to the instruction; or
receive an instruction for replacing a broadcast content and replace a corresponding broadcast content in the preset broadcast content set according to the instruction.

In one possible implementation, the apparatus further includes: a broadcast emoji control module, configured to display preset emoji on a screen of the smart device during voice broadcast.

After the method and apparatus for controlling the smart device of the exemplary implementations of the present disclosure are described, a calculating apparatus according to another exemplary implementation of the present disclosure is described.

Those skilled in the art may understand that all aspects of the present disclosure may be implemented as a system, a method or a program product. Therefore, all the aspects of the present disclosure may be further implemented in the following manner, that is: a complete hardware implementation, a complete software implementation (including a firmware, a microcode, etc.), or a hardware and software aspect combined implementation, which may be generally called "a circuit", "a module" or "a system".

In some possible implementations, the calculating apparatus according to the present disclosure may at least include at least one processor and at least one memory, wherein the memory stores a program code, and when the program code is executed by the processor, the processor is made to execute steps in the method for controlling the smart device according to various exemplary implementations of the present disclosure described above in the description. For example, the processor may execute step 201 to step 203 shown in FIG. 2.

The calculating apparatus 130 according to the implementation of the present disclosure is described below with reference to FIG. 6. The calculating apparatus 130 shown in FIG. 6 is only an example and should not bring any limit to functions and an application range of the embodiments of the present disclosure.

Figure 6:
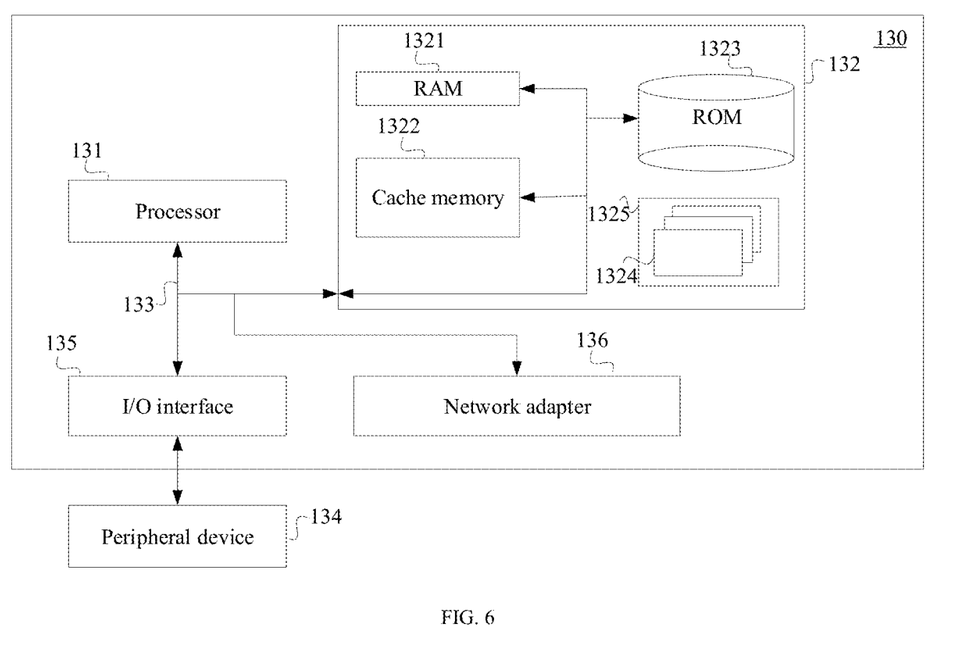
FIG. 6 is a schematic structural diagram of a calculating apparatus according to an implementation of the present disclosure.

As shown in FIG. 6, the calculating apparatus 130 is expressed in a form of a general calculating apparatus. Components of the calculating apparatus 130 may include but are not limited to: the at least one processor 131, the at least one memory 132 and a bus 133 connected with different system components (including the memory 132 and the processor 131).

The bus 133 represents one or more kinds of several bus structures and includes a memory bus or a memory controller, a peripheral bus, a processor or a local bus adopting any one of a plurality of bus structures.

The memory 132 may include a readable medium in a form of a volatile memory, e.g., a random access memory (RAM) 1321 and/or a cache memory 1322, and may further include a read-only memory (ROM) 1323.

The memory 132 may further include a program/practical tool 1325 including one group (at least one) of program module 1324, the program module 1324 includes but is not limited to: an operating system, one or more applications, other program modules and program data, each examples or a certain combination of examples may include implementation of a network environment.

The calculating apparatus 130 may communicate with one or more external devices 134 (e.g., a keyboard, a pointing device, etc.), or communicate with one or more devices capable of enabling a user to interact with the calculating apparatus 130, and/or communicate with any device (e.g., a router, a modem, etc.) which enables the calculating apparatus 130 to communicate with one or more other calculating apparatuses. This communication may be performed through an input/output (I/O) interface 135. Besides, the calculating apparatus 130 may further communicate with one or more internets (e.g., a local area network (LAN), a wide area network (WAN) and/or a public network, e.g., an internet through a network adapter 136. As shown in figures, the network adapter 136 communicates with other modules for the calculating apparatus 130 through the bus 133. It should be understood that though not shown in figures, other hardware and/or software modules may be adopted in combination with the calculating apparatus 130, including but not limited to: a microcode, a device driver, a redundancy process, a peripheral disk drive array, RAID system, a tape drive, a data backup storage system, etc.

In some possible implementations, all the aspects of the method for controlling the smart device provided by the present disclosure may be further implemented in a form of a program product, including a program code. When the program product runs on a computer device, the program code is used for making the computer device execute steps in the method for controlling the smart device according to various exemplary implementations of the present disclosure described above in the description. For example, the computer device may execute step 201 to step 203 shown in FIG. 2.

The program product may adopt one readable medium or any combination of more readable media. The readable medium may be a readable signal medium or a readable storage medium. The readable storage medium may be but not limited to, for example, an electric, magnetic, optical, electromagnetic, infrared ray or semi-conductor system, apparatus or device, or any combination of them. A more specific example (not exhaustive list) of the readable storage medium includes: an electric connector with one or more wires, a portable disc, a hard disc, a random access memory (RAM), a read-only memory (ROM), an electrically programmable read-only memory (EPROM) or a flash memory, an optical fiber, a portable compact disc read-only memory (CD-ROM), a light storage device, a magnetic storage device or any proper combination of them.

The program product for smart device control in the implementation of the preset disclosure may adopt the portable compact disc read-only memory (CD-ROM) and include the program code and may run on the calculating apparatus. However, the program product of the present disclosure is not limited herein, the readable storage medium may be any visible medium including or storing a program, and the program may be used by an instruction executing system, apparatus or device or be used in combination with them.

The readable signal medium may include a data signal in a base band or spread partially as a carrier wave, which carries a readable program code. This spread data signal may adopt various forms, including but not limited to an electromagnetic signal, an optical light or any proper combination of them. The readable signal medium may further be any readable medium, except for the readable storage medium, and the readable medium may send, spread, or transmit a program which is used by the instruction executing system, apparatus or device or is used in combination with them.

The program code included in the readable medium may be transmitted through any proper medium, including but not limited to wireless, wired, optical cable, radio frequency (RF), etc. or any proper combination of them.

The program code for executing operation of the present disclosure may be written in one programming language or any combination of more programming languages. The programming language includes an object-oriented programming language, e.g., Java, C++, etc., further includes a conventional procedural programming language, e.g., a "C" language or a similar programming language. The program code may be completely executed on a user calculating apparatus, partially executed on a user device, executed as an independent software package, executed partially on the user calculating apparatus and partially on a remote calculating apparatus, or completely executed on the remote calculating apparatus or a server. When is comes to the remote calculating apparatus, the remote calculating apparatus may be connected to the user calculating apparatus through any kind of networks, including the local area network (LAN) or the wide area network (WAN), or connected to an external calculating apparatus (e.g., adopting an internet service provider for connection through the internet).

It should be noted that through a plurality of units or sub-units of the apparatus are mentioned in the above detailed description, this division is only exemplary but not forced. Actually, according to the implementations of the present disclosure, features and functions of two or more units in the above description may be specified in one unit. Reversely, features and functions of one unit in the above description may be further divided into more units to be specified.

Besides, though operations of the method of the present disclosure is described in a specific sequence in the drawings, it not required or hinted that these operations must be executed in the specific sequence, or all the shown operations must be executed to achieve an expected result. Additionally or alternatively, some steps may be omitted, a plurality of steps may be combined into one step for executing, and/or one step may be divided into a plurality steps for executing.

Those skilled in the art should understand that the embodiments of the present disclosure may be provided as a method, a system or a computer program product. Therefore, the present disclosure may adopt forms of a complete hardware embodiment, a complete software embodiment or a software and hardware aspect combined embodiment. Besides, the present disclosure may adopt a form of the computer program product which is implemented on one or more computer applicable storage media (including but not limited to the magnetic disk memory, CD-ROM, the optical memory, etc.) including a computer applicable program code.

The present disclosure is described with reference to a flowchart and/or a block diagram of the method, the device (system), and the computer program product according to the embodiments of the present disclosure. It should the understood that each flow and/or each block in the flowchart and/or the block diagram and a combination of flows and/or blocks in the flowchart and/or the block diagram may be achieved through computer program instructions. These computer program instructions may be provided for a general-purpose computer, a special-purpose computer, an embedded processor or a processor of other programmable data processing equipment to generate a machine, so that the instructions executed by a computer or the processor of other programmable data processing equipment generate a apparatus used for implementing functions specified in one flow or more flows of the flowchart and/or one block or more blocks of the block diagram.

These computer program instructions may be also stored in a computer readable memory capable of guiding the computer or other programmable data processing equipment to work in a specific manner, so that the instructions stored in the computer readable memory may generate a product including an instruction apparatus, and the instruction apparatus achieves the functions specified in one flow or more flows of the flowchart and/or one block or more blocks of the block diagram.

These computer program instructions may be also loaded to the computer or other programmable data processing equipment, so that a series of operation steps are executed on the computer or other programmable equipment to generate processing implemented by the computer, then the instructions executed on the computer or other programmable equipment provide steps for achieving the functions specified in one flow or more flows of the flowchart and/or one block or more blocks of the block diagram.

Although the preferred embodiments of the present disclosure are described, those skilled in the art may make other changes and modifications to these embodiments once they know a basic creative concept. Therefore, the appended claims intend to be constructed as including the preferred embodiments and all the changes and modifications which fall within the scope of the present disclosure.

Apparently, those skilled in the art may make various changes and modifications to the present disclosure without departing from the spirit and scope of the present disclosure. In this case, if these changes and modifications of the present disclosure fall within the scope of claims and the equivalents thereof, the present disclosure intends to include these changes and modifications.

What is claimed is:

1. A method for controlling a smart device, comprising:
collecting an image of a surrounding environment of the smart device when the smart device is in a dormant state;
triggering the smart device to broadcast voice if a character feature is detected in the collected image and a distance between a target with the character feature and the smart device is less than or equal to a first specified distance; and
awakening the smart device if the distance between the target and the smart device is detected less than or equal to a second specified distance after the voice is broadcasted, wherein the second specified distance is less than the first specified distance.

2. The method according to claim 1, wherein the character feature comprises at least one of the following features: a human face feature and a human body feature.

3. The method according to claim 1, wherein the collecting the image of the surrounding environment of the smart device comprises:
collecting a color map and a depth map of an object in front of the smart device in real time;
wherein the triggering the smart device to broadcast voice if the character feature is detected in the collected image and the distance between the target with the character feature and the smart device is less than or equal to the first specified distance comprises:
performing character feature detection in real time according to the color map; and
for each detected character feature:
determining corresponding data of the target with the character feature in the depth map;
determining the distance between the target with the character feature and the smart device according to the corresponding data of the target with the character feature in the depth map; and
triggering the smart device to broadcast voice if the distance is less than or equal to the first specified distance.

4. The method according to claim 1, further comprising:
determining that the voice will not be broadcasted repeatedly after voice broadcast is finished, if a distance between at least one of other targets with the character feature and the smart device is detected less than or equal to the first specified distance during voice broadcast.

5. The method according to claim 1, further comprising:
after voice broadcast is finished for a set duration, broadcasting the voice repeatedly if a distance between at least one of other targets with the character feature and the smart device is detected less than or equal to the first specified distance.

6. The method according to claim 1, wherein the triggering the smart device to broadcast voice comprises:
triggering the smart device to broadcast voice in a volume larger than a preset volume, wherein the preset volume is a volume during interaction with the target after the smart device is awakened.

7. The method according to claim 1, wherein triggering the smart device to broadcast voice comprises:
triggering the smart device to broadcast voice by randomly selecting a broadcast content from a preset broadcast content set; or
triggering the smart device to broadcast voice by sequentially selecting broadcast contents from a preset broadcast content set; or
triggering the smart device to broadcast voice circularly on broadcast contents in a preset broadcast content set.

8. The method according to claim 7, further comprising:
receiving an instruction for adding a broadcast content, and adding a broadcast content included in the instruction into the preset broadcast content set; or
receiving an instruction for altering a broadcast content and altering a corresponding broadcast content in the preset broadcast content set according to the instruction; or
receiving an instruction for replacing a broadcast content and replacing a corresponding broadcast content in the preset broadcast content set according to the instruction.

9. The method according to claim 1, further comprising:
displaying preset emoji on a screen of the smart device during voice broadcast.

10. A non-transitory computer readable medium, storing a computer executable instruction, wherein the computer executable instruction is configured to cause a computer to execute the method according to claim 1.

11. A calculating apparatus, comprising:
at least one processor; and
a memory in communication connection with the at least one processor;
wherein the memory stores an instruction executable by the at least one processor, and the instruction is executed by the at least one processor to cause the at least one processor to execute the method according to claim 1.

12. An apparatus for controlling a smart device, comprising:
an image collection module, configured to collect an image of a surrounding environment of the smart device when the smart device is in a dormant state;
a pre-awakening module, configured to trigger the smart device to broadcast voice if a character feature is detected in the collected image and a distance between a target with the character feature and the smart device is less than or equal to a first specified distance; and
an awakening module, configured to awaken the smart device if the distance between the target and the smart device is detected less than or equal to a second specified distance after the voice is broadcasted, wherein the second specified distance is less than the first specified distance.

13. The apparatus according to claim 12, wherein the character feature comprises at least one of the following features: a human face feature and a human body feature.

14. The apparatus according to claim 12, wherein:
the image collection module is further configured to collect a color map and a depth map of an object in front of the smart device in real time;
wherein the pre-awakening module is further configured to:
perform character feature detection in real time according to the color map; and
for each detected character feature:
determine corresponding data of the target with the character feature in the depth map;
determine the distance between the target with the character feature and the smart device according to the corresponding data of the target with the character feature in the depth map; and
trigger the smart device to broadcast voice if the distance is less than or equal to the first specified distance.

15. The apparatus according to claim 12, wherein the pre-awakening module is further configured to:
- determine that the voice will not be broadcasted repeatedly after voice broadcast is finished, if a distance between at least one of other targets with the character feature and the smart device is detected less than or equal to the first specified distance during voice broadcast.

16. The apparatus according to claim 12, wherein the pre-awakening module is further configured to:
- after voice broadcast is finished for a set duration, broadcast the voice repeatedly if a distance between at least one of other targets with the character feature and the smart device is detected less than or equal to the first specified distance.

17. The apparatus according to claim 12, wherein the pre-awakening module is further configured to:
- trigger the smart device to broadcast voice in a volume larger than a preset volume, wherein the preset volume is a volume during interaction with the target after the smart device is awakened.

18. The apparatus according to claim 12, wherein the pre-awakening module is further configured to:
- trigger the smart device to broadcast voice by randomly selecting a broadcast content from a preset broadcast content set; or
- trigger the smart device to broadcast voice by sequentially selecting broadcast contents from a preset broadcast content set; or
- trigger the smart device to broadcast voice circularly on broadcast contents in a preset broadcast content set.

19. The apparatus according to claim 18, further comprising: a broadcast content maintenance module, wherein the broadcast content maintenance module is configured to:
- receive an instruction for adding a broadcast content, and adding a broadcast content included in the instruction into the preset broadcast content set; or
- receive an instruction for altering a broadcast content and altering a corresponding broadcast content in the preset broadcast content set according to the instruction; or
- receive an instruction for replacing a broadcast content and replacing a corresponding broadcast content in the preset broadcast content set according to the instruction.

20. The apparatus according to claim 12, further comprising: a broadcast emoji control module, wherein the broadcast emoji control module is configured to:
- display preset emoji on a screen of the smart device during voice broadcast.

\* \* \* \* \*